United States Patent Office 3,216,467
Patented Nov. 9, 1965

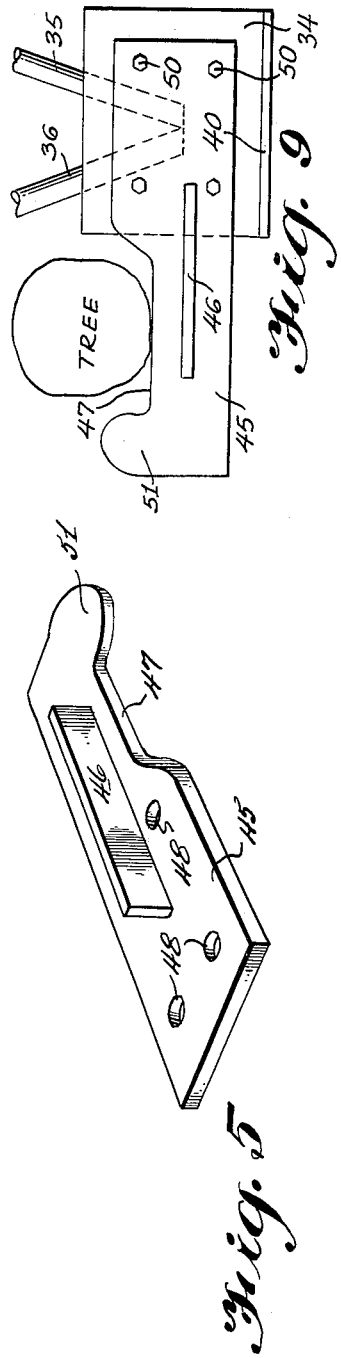
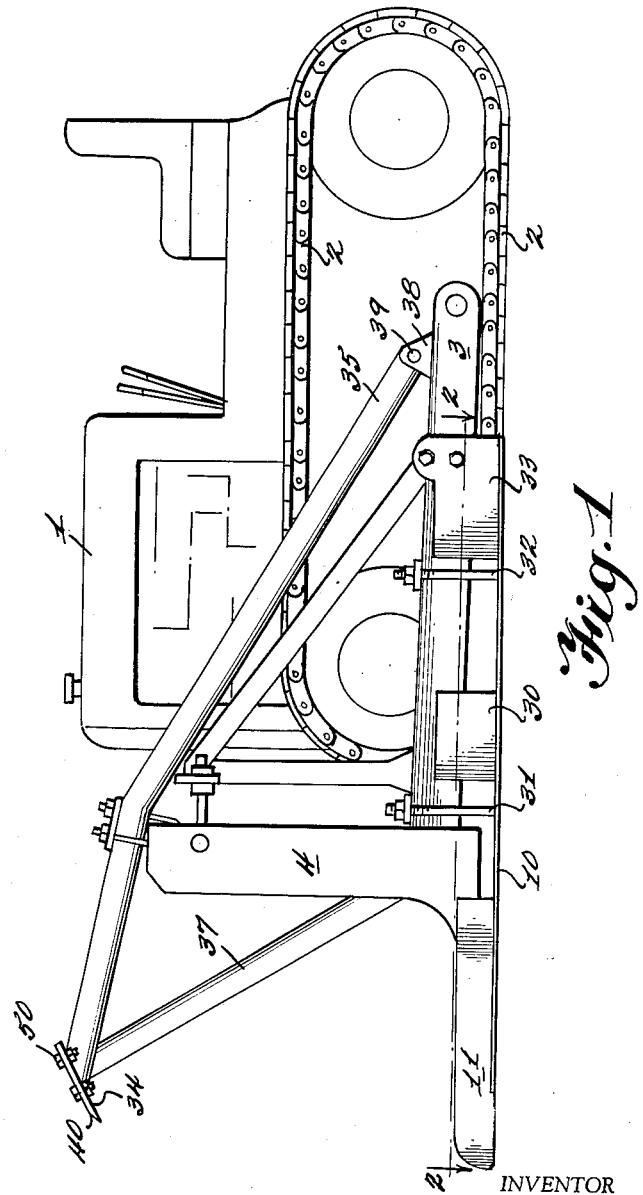

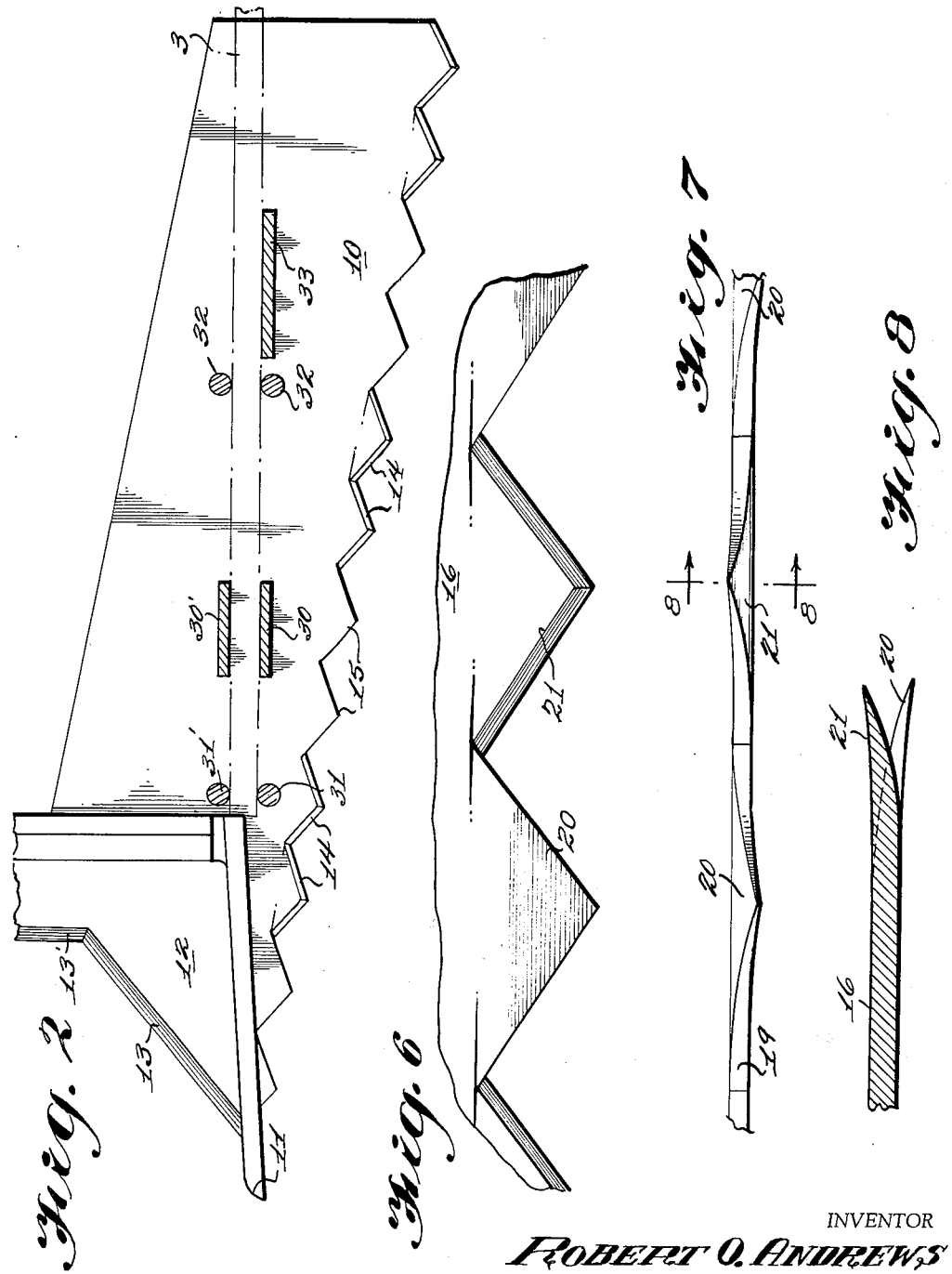

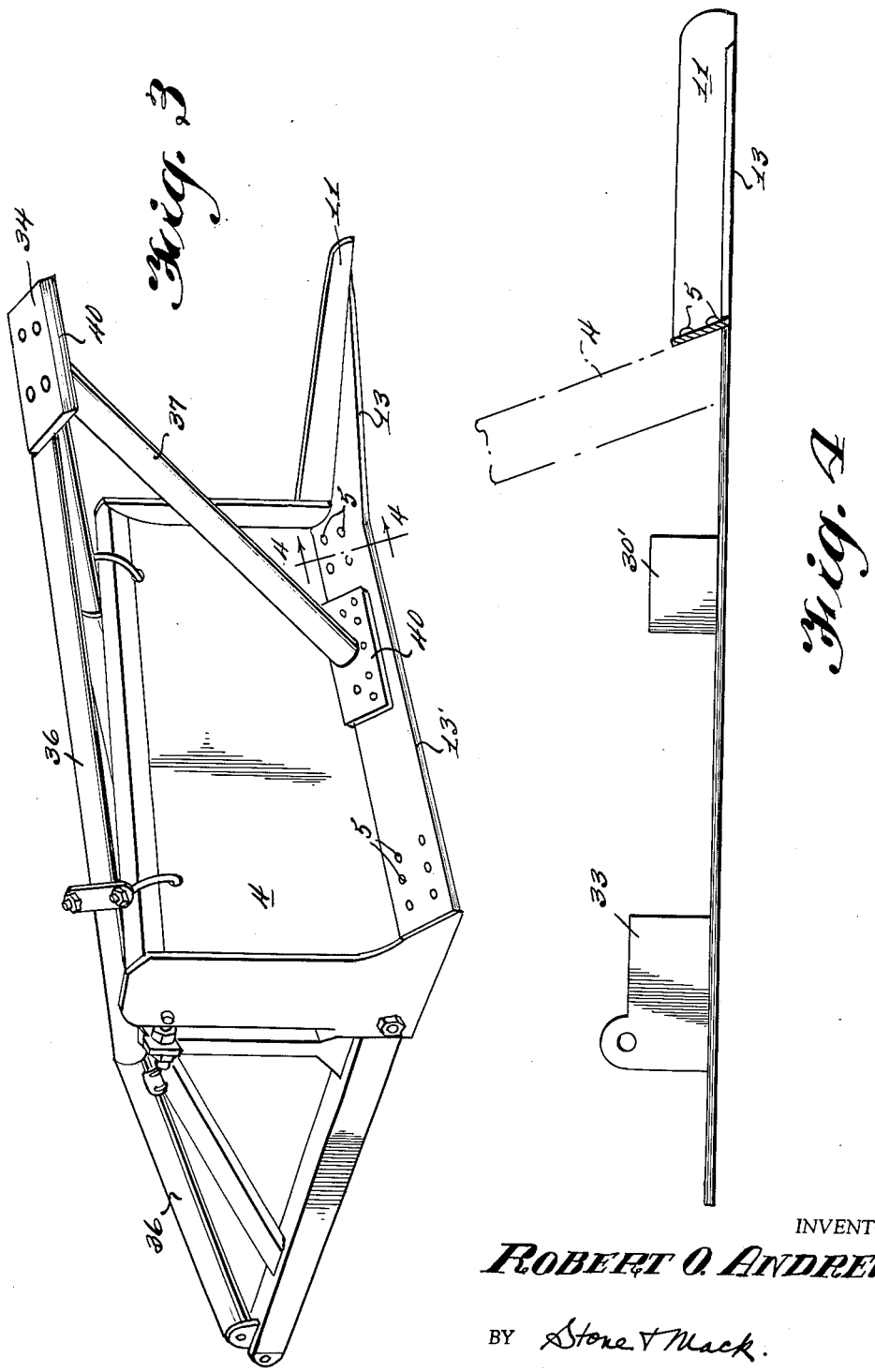

3,216,467
TREE FELLING AND LAND-CLEARING
ATTACHMENT
Robert O. Andrews, Box 726, Olney, Tex.
Filed June 8, 1962, Ser. No. 205,149
4 Claims. (Cl. 144—34)

This invention relates to means for cutting down trees and clearing of land. It has special reference to a heavy duty device which will cut down trees of relatively large diameter in a minimum of time.

This application is filed as a continuation-in-part of my application Serial No. 706,973, filed January 3, 1958, for Tree Felling and Land-Clearing Attachment, and now abandoned.

One of the objects of the invention is to provide a means by which, when applied to a large vehicle of the tractor type, it will be possible to saw through a tree while it is being passed by the vehicle; really, a single-pass tree cutter which expedites greatly the operation of felling large trees.

One of the principal objects is to provide a faster means for cutting trees close to the ground. Therefore, a clearing attachment is provided which travels over the land to be cleared at surface level and cuts the trees and bushes at ground level. Also, in the case of some trees too large to be cut down in one pass of the cutter, the roots of the tree may be severed near the ground level and then the tree may be pushed over more easily by the pushing means forming part of this invention.

Another object is to provide a strong yet light weight tree cutting blade which may be installed on the front of a bulldozer, tractor, or the like with the least modification of the latter, and which may be operated effectively by anyone who can operate a bulldozer or a tractor.

Another object is to provide a selection of saw blades having a particular and special teeth construction to facilitate maximum cutting efficiency.

Another object is to provide a selection of saw blades having a particular and special tooth construction to facilitate maximum cutting efficiency. The tooth design is one of the most important parts of the invention for it enables the saw to cut a notch wider than the saw blade thus reducing binding of the blade during the sawing operation to a minimum.

Still another object is to provide a tree hook which may be employed to hook onto the trunk of a tree and pull it back from the bank of a stream or of a ravine so as to prevent the cut tree from falling into the stream or ravine.

Yet another object of the invention is to provide a cutter blade which lies transversely across the front of the bulldozer, tractor, or the like and a splitting point projecting forwardly of the blade together with another blade at an acute angle to the cutter path said blade being saw-edged, the cutter blade and the saw blade being on opposite sides of the splitting point.

These and other objects and advantages will become more apparent as the description of the invention proceeds.

In the accompanying drawings forming a part of this application:

FIGURE 1 is a side elevation showing the attachment secured to a caterpillar-type tractor;

FIGURE 2 is a top plan view of a portion of the cutter per se, taken on the line 2—2 of FIGURE 1;

FIGURE 3 is a front elevation in perspective showing the bulldozer blade and the tree pushing element;

FIGURE 4 is a cross-sectional view taken on the line 4—4 of FIGURE 3 and viewed in the direction of the arrows;

FIGURE 5 (Sheet 1) is a perspective view of the tree-hooking element;

FIGURE 6 (Sheet 2) is a plan view of a modification of a saw blade such as shown in FIGURE 2;

FIGURE 7 is a front elevation view of FIGURE 6;

FIGURE 8 is a cross-sectional view taken on line 8—8 of FIGURE 7; and

FIGURE 9 (Sheet 1) is a view showing the tree-hooking element attached to the bumper element shown in FIGURE 3.

Referring now to the drawings, FIG. 1 shows a large track-type tractor 1, forming no part of this invention, to which the attachments described herein are secured. The crawler tracks on which the tractor runs are shown at 2, and one of the tractor push beams is shown at 3 secured to the mold-board 4 and the bulldozer blade customarily furnished with the tractors.

The attachment, forming part of this invention, is intended to be attached to the mold board where the cutting edges would normally be attached when the worn cutting edges are replaced. These cutting edges are usually secured to the mold board by being bolted thereto, as shown at 5, FIGURES 3 and 4.

Turning now to FIGURE 2, the attachment or clearing blade which is made of thick steel consists of a saw portion 10, a tree splitting point portion 11, and a cutting edge portion 12. Portions 10 and 12 are situated on opposite sides of the splitting point. The tree-clearing portion lies in a horizontal plane, the tree splitting point portion rises vertically from this horizontal plane, and the cutting edge portion, as may be seen in FIG. 3, slopes and is in a position oblique to a vertical plane. It slopes so as to conform to the mold board of the bulldozer and replaces the customary bulldozer cutting edge. As a practical matter these portions after having been fashioned from heavy steel plate stock would be integrally welded to each other to form a unitary member.

As shown in FIG. 2, the saw attachment is fastened to bulldozer blade and extends rearwardly therefrom at an angle away from the pushbeam 3. The tree-splitting point portion 11 is welded in a vertical position to the saw blade.

The horizontally and outwardly extending saw portion 10 is placed rearwardly of point 11 and lies on one side thereof, thereby placing said toothed portion so that it and the horizontal blade portion 12 are on opposite sides of the splitter. The extreme end of the point 11 is some distance forward of the saw teeth and the diagonal cutting edge 13 so as to enable the point to be driven into trees before either the saw or the diagonal cutting edge strikes the tree. As before stated, the small end of the saw is in front and the cutting teeth are disposed in a series extending backwardly and laterally away from this forward end. The saw teeth are placed on the outside edge of the saw portion 10 with two teeth 14, 14, beveled in the same direction and two teeth 15, 15, beveled in a direction opposite to the beveling on teeth 14. Such is the saw tooth arrangement shown in FIG. 2. The teeth are set in pairs with every other pair bent upward or downward to provide a slightly wider cut than the thickness of the blade, thus preventing binding of the saw during the sawing operation.

In FIG. 6, the saw blade 16 is shown as having alternating pointed teeth 21 and 20. Tooth 21 is beveled in a direction opposite to the beveling on tooth 20 and each tooth is bent upward or downward as desired.

In FIG. 7, the saw blade 16 is shown as having alternating pointed teeth 20 and 21 each tooth being beveled in a direction opposite to the beveling on the other tooth and each tooth is shown as being bent; tooth 20 being bent downwardly and tooth 21 being bent upwardly. The structure is more clearly shown in FIG. 8.

Starting at a point to the rear of the tree-splitting point 11 is the cutting edge portion 12 consisting of the cutting edges 13 and 13'. The cutting edges 13 and 13' are shaped as shown, the edge 13' extending to the far side (as viewed in FIG. 1) of the bulldozer and this cutting edge portion 12 is detachably secured to the mold board by means of a plurality of bolts 5.

The tree splitting point 11 splits the tree more efficiently if the point can be driven into the tree further before either the saw portion or the diagonal cutting edge 13 strikes the tree.

A pair of steel plates 30 and 30' are carried by the saw blade and the pushbeam lies between them. The pair of steel plates 30 and 30' do not prevent the pushbeam from lashing against the track, but a steel bracket (not shown) bolted to the tractor track roller frame and working against the bulldozer pushbeam prevents the latter from lashing against the track when a tree is cut. This bracket is not shown in FIG. 1 because it is directly between the pushbeam and the track and is hidden by plate 30' and the tractor pushbeam 3. The saw portion 10, tree-splitting point portion 11, and cutting edge portion 12, being united by welding into one unit, is attached to the pusher beam 3 by means of bolts 31 and 31' and bolts 32 and by the member 33 carried by the saw blade and detachably secured to the pushbeam. Member 33 is welded to the saw blade.

The tree felling attachment or bumper 34 is supported, as shown in FIGS. 1 and 3, by means of supporting pipes 35 and 36, and pipe 37; pipes 35 and 36 being suitably secured to the bulldozer and pushbeam portions of the tractor, as shown. The exact manner of support forms no part of the invention, that which is shown being by way of example only. Pipes 35 and 36 are trunnioned on pushbeams 3 as shown by elements 38 and 39. Pipe 37 is supported at its base by a member 40 suitably bolted to the cutting edge portion, which member may be detached whenever the cutting edge portion is removed. As shown in FIGS. 1 and 3, the tree bumper 34 is detachably secured to the pipes 35, 36, and 37 and the blade 40 thereof slants downwardly so that when the tractor is lifted in position to strike a tree, the bumper strikes the tree in a horizontal position and hence bites into the tree trunk and does not ride up upon or slide on the tree. Since the bumper extends only about five feet in front of the blade it is quite easy to maneuver it in congested places.

In FIG. 5 there is shown a tree hook 45 shaped as shown to provide a hook portion 47. The hook is designed to be bolted upon the top of the bumper by means of the bumper bolts 50 and bolt holes 48. The tree hook is strengthened by upstanding member 46 and the hook portion 47 is mounted to face toward the operator of the tractor. As shown in FIGURE 9, the tree-hook 45 is mounted, when needed, upon the top of the bumper 34 by removing the bumper bolts 50 and placing them in bolt holes 48 of the tree hook and thence into the bolt holes of the bumper 34, the tree-hook having the hook portion 47 facing toward the operator of the tractor. A tree, designated as such, is shown as being partially embraced by the hook portion 47. The tree, after having been cut by the saw, is about to fall. The tractor is maneuvered so that the hook portion 47 is on the side of the tree opposite to the tractor and when the tractor is reversed, the tree usually slides toward the right hand side of the hook (as viewed in FIG. 5) but the portion 51 prevents the tree from sliding off the hook.

The saw blade being mounted as described, that is, side mounted, exerts tremendous pressure on the tree as the tractor passes by the tree, thereby forcing the blade into the tree rather than running it past the tree. When the tree is weakened by the side mounted saw blade cutting into it, the tree bumper 34 contacts the tree and by means of leverage exerts substantially double the power the tractor would normally have.

In contrast to structures in the prior art where the blades are mounted in front, the side-mounted saw blade of this invention exerts more pressure on the tree because of a lack of leverage. Where the leverage is great as in front-mounted saws, the saw cannot exert as much force against the tree as the saw blade herein disclosed. When the saw blade herein disclosed is used the whole weight of the tractor must be pushed aside if the tree is not cut, due to the toughness of the tree. By locating the saw blade as disclosed, the full weight of the tractor is used to force the blade into the tree. Since each tooth is beveled on opposite sides, the blade cuts a notch in the tree as wide as the blade is thick thereby enabling the saw to cut deeply into the tree without binding.

Operation

Since a bulldozer and the tractor described are readily adapted as a means for mounting the invention because they may readily be raised, lowered, or held in a desired position by the operator of the tractor, in operation, the device mounted as above described will be moved to a position substantially parallel with the plane of travel of the vehicle so that the tree-splitting point will split off some three or four inches of a tree. After the point passes by the tree, the teeth of the saw will contact the tree, and as the tractor is moved past the tree, the saw will be forced into it. Sometimes it is necessary to drive the tractor back and forth past large trees to cause the saw to cut in as deeply as possible, and some trees need to be sawed on more than one side. After the tree is weakened, the operator can raise the clearing blade and by means of the tree bumper, easily push over large trees. If a part of the stump is left sticking up, it is possible to shear it off by running the point of the clearing blade back over the stump.

The portion of the cutting edge extending across the front of the bulldozer may be used on smaller trees and will usually shear them off at ground level. If the clearing operation calls for uprooting the trees, the saw and tree splitting portion and the cutting edge portion may be removed, and the bumper, rebolted to the bulldozer, may be employed to push over large trees. Should the trees be dragged by the use of an anchor chain, the bumper is particularly useful for with the saw removed, the bulldozer blade may be used to make a path for the tractor over rough ground, and at the same time the bumper may be used on any large trees that could not be pushed over without it.

The hook, shown in FIG. 5, is very efficient in pulling trees back from a creek or river bank when the tractor cannot be operated to push them in the desired direction. The tree is cut first with the saw until it is almost ready to fall, and then the tractor is maneuvered so that the hook portion 47 is on the side of the tree opposite to the tractor. When the tractor is reversed, the tree usually slides toward the right hand side of the hook (as viewed in FIG. 5) but is prevented from sliding off the end of the hook by the portion 51. By employing this hook, it is estimated that the cost of clearing trees along a creek or river bank can be reduced by 75% since if the trees are permitted to fall into the water, the only way to remove them is to tie a cable to them and pull them out, requiring at least two men, one to attach the cable and one to operate the tractor, whereas it only requires a tractor operator to retrieve such trees with the device described. The cable method is about one-third as fast as the hook method, since it is often quite difficult to secure the cable to the tree and to later unfasten it.

Due to the light weight yet strong construction, special saw tooth design, and the inclusion of the bumper and tree hook, the apparatus disclosed herein in practice is more efficient for use on trees above twelve inches in diameter than any apparatus known to the applicant and in use today. It is especially useful in connection with a type of D-7 "Caterpillar" tractor on trees twelve to forty inches in diameter.

The invention is not limited to the exact form shown in the drawings, for obviously changes may be made therein within the scope of the claims.

What is claimed is:

1. A heavy duty tree cutter for use with a self propelled vehicle having means for pushing, raising and lowering a bulldozer moldboard carried thereby comprising: a substantially horizontal rigid blade having a leading cutting edge extending transversely throughout the width of said bulldozer moldboard and adapted to be secured to the lowermost edge portion of said bulldozer moldboard, a horizontally and outwardly extending saw portion the cutting edge of which is rearwardly diverging, and a tree-splitting point portion forwardly of said saw portion, said elongated blade and said saw portion lying on opposite sides of said splitting point portion, said leading cutting edge continuing beyond said bulldozer moldboard diagonally and terminating at a point slightly to the rear of said tree-splitting point portion, and means for attaching said blade to said bulldozer moldboard, said pushing, and said raising and lowering means.

2. A heavy duty tree cutter for use with a self propelled vehicle having means for pushing, raising and lowering a bulldozer moldboard carried thereby comprising: a substantially horizontal rigid blade having a leading cutting edge extending transversely throughout the width of said bulldozer moldboard and adapted to be secured to the lowermost edge portion of said bulldozer moldboard, a hoizontally and outwardly extending saw portion the cutting edge of which is rearwardly diverging, and a tree-splitting point portion forwardly of said saw portion, said elongated blade and said saw portion lying on opposite sides of said splitting point portion, said leading cutting edge continuing beyond said bulldozer moldboard diagonally and terminating at a point slightly to the rear of said tree-splitting point portion, and means for attaching said blade to said bulldozer moldboard, said pushing, and said raising and lowering means, so that said blade is carried forwardly of said vehicle and transversely to the side of said vehicle whereby the forward movement of said vehicle will force said tree-splitting point portion into the trunk of a tree and thereafter will force said saw portion through the trunk of a tree.

3. In a heavy duty tree cutter as set forth in claim 1, said transversely extending saw portion consisting of a longitudinal series of spaced cutting teeth of equal size arranged in regularly spaced relation along the outer edge of said saw portion, one tooth being beveled one way, then the next tooth being beveled the opposite way, the beveling of the teeth being from their respective tips backward to said blade.

4. In a heavy duty tree cutter as set forth in claim 1, said transversely extending saw portion consisting of a longitudinal series of spaced cutting teeth of equal size arranged in regularly spaced relation along the outer edge of said saw portion, the cutting teeth as a matter of group arrangement being set in pairs, the pairs alternating, the teeth of one pair being beveled one way and the teeth of the adjoining pair being beveled the opposite way, the beveling of the teeth being from their respective tips backward to said blade.

References Cited by the Examiner

UNITED STATES PATENTS

| | | | |
|---|---|---|---|
| Re. 23,895 | 11/54 | Winget | 144—34 |
| 245,588 | 8/81 | Van Bibber | 143—133 |
| 969,469 | 9/10 | Gose | 144—34 X |
| 1,246,905 | 11/17 | Garlock et al. | |
| 2,351,737 | 6/44 | Blum | 143—133 |
| 2,512,666 | 6/50 | Meske | 144—34 |
| 2,542,952 | 2/51 | White | 144—34 X |
| 2,633,880 | 4/53 | Mattson | 144—34 |
| 2,672,171 | 3/54 | Jones | 144—34 |
| 2,701,591 | 2/55 | Kissner et al. | 144—34 |
| 2,821,217 | 1/58 | Shald | 144—34 |

ROBERT C. RIORDON, *Primary Examiner.*

EARL EMSHWILLER, WILLIAM W. DYER, LESTER M. SWINGLE, *Examiners.*